(12) United States Patent
Saneyoshi et al.

(10) Patent No.: US 6,385,334 B1
(45) Date of Patent: May 7, 2002

(54) SYSTEM AND METHOD FOR ADJUSTING STEREO CAMERA

(75) Inventors: Keiji Saneyoshi; Hideaki Tsuchiya, both of Mitaka (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/265,379

(22) Filed: Mar. 10, 1999

(30) Foreign Application Priority Data

Mar. 12, 1998 (JP) .......................................... 10-061577

(51) Int. Cl.[7] ................................................ G06K 9/00
(52) U.S. Cl. ...................................... 382/154; 382/276
(58) Field of Search ................................ 382/154, 153, 382/291, 276, 285, 106; 348/42, 47, 116; 345/473, 419; 352/50

(56) References Cited

U.S. PATENT DOCUMENTS

| 5,699,444 A | * | 12/1997 | Palm ........................... 382/106 |
| 5,748,199 A | * | 5/1998 | Palm ........................... 345/473 |
| 6,028,954 A | * | 2/2000 | Tomita et al. ............... 382/154 |
| 6,031,941 A | * | 2/2000 | Yano et al. .................. 382/276 |

FOREIGN PATENT DOCUMENTS

| JP | 5-157557 | 6/1993 |
| JP | 10-307352 | 11/1998 |

* cited by examiner

Primary Examiner—Andrew W. Johns
Assistant Examiner—Seyed Azarian
(74) Attorney, Agent, or Firm—Smith, Gambrell & Russell, LLP

(57) ABSTRACT

In a correction operating part 10c, three regions including two distant regions and one near region are selected on a reference image picked up by a main camera 2, and distance data are added to the positions of the respective regions to define a range, in which corresponding regions exist, in a comparative image picked up by a sub-camera 3 to search the range to determine the positions of the regions at a resolution of one pixel or less. Then, on the basis of one of the distant regions, a translation correction value and an angle of rotation for the comparative image are derived from the relationship between the positions of the respective regions to be added to the set value of an affine transforming circuit 18 to parallel-displace and rotate the comparative image. Thereafter, an angle of rotation for causing the horizontal line of the main camera 2 to be parallel to the base line of a stereo camera is derived to be added to the set value of an affine transforming circuit 17 to rotate the reference image. Thus, the deviation of the optical axis of the stereo camera is automatically adjusted while carrying out a usual operation for picking up an image of an ordinary landscape to carry out the stereo image processing.

6 Claims, 5 Drawing Sheets

SYSTEM AND METHOD FOR ADJUSTING STEREO CAMERA

BACKGROUND OF THE INVENTION

1. Field of the Invention

The present invention relates generally to a stereo camera system and method for adjusting the deviation of an optical axis of a stereo camera.

2. Related Background Art

As a three-dimensional measuring technique based on images, there is known an image processing based on a so-called stereo method for deriving a correlation between a pair of images, which are obtained by picking up an object from different positions by two cameras (a stereo camera), to derive a distance by a parallax for the same object on the basis of the principle of triangulation using camera parameters, such as the mounting position and focal length of the stereo camera.

In this image processing based on the stereo method, two picture signals obtained by the stereo camera are sequentially shifted to be superposed on each other to derive a position at which the two picture signals are coincident with each other. Therefore, it is desired that there are no deviations other than the parallax between the two picture signals, so that the optical positioning of the stereo camera is important.

Thus, Japanese Patent Laid-Open No. 5-157557 discloses that a holding member for connecting and holding a pair of video cameras has parallelism adjusting means for adjusting the arrangement of pixels of an image sensor of one of the video cameras so as to be parallel to the arrangement of pixels of an image sensor of the other video camera, and an optical axis adjusting member for adjusting the optical axis of one of the video cameras so as to be parallel to the optical axis of the other video camera, so that the correlation between the two cameras is mechanically adjusted and held.

However, even if the stereo camera is fixed once, the deviation of the stereo camera is easily caused with secular change. Conventionally, if such a deviation is caused, the stereo camera must be mechanically readjusted. Therefore, it is not only required to carry out the complicated operation, but it also takes a lot of time to readjust the stereo camera, so that there is a limit to the mechanical adjustment to ensure required accuracy.

In order to cope with this problem, Japanese Patent Application No. 9-117268, which is assigned to the present Assignee and incorporated herein by reference, discloses a technique for electrically adjusting the optical position of a stereo camera without the need of any mechanical adjustments. This technique can accurately adjust the optical position of a stereo camera to a level, at which it is difficult to mechanically adjust the optical position of the stereo camera, and easily readjust the deviation due to secular change after the adjustment.

However, since the technique disclosed in Japanese Patent Application No. 9-117268 is designed to pick up an image of a special adjusting pattern by means of a stereo camera to correct the optical position of the stereo camera, it is required to periodically stop the operation of the stereo camera in an image processing field to adjust the optical position of the stereo camera, so that it is required to care maintenance.

SUMMARY OF THE INVENTION

It is therefore an object of the present invention to eliminate the aforementioned problems and to provide a stereo camera adjusting system and method capable of automatically adjusting the age-based deviation of the optical axis of a stereo camera while maintaining the operating state thereof from an early stage, in which it is possible to disregard the influence on ranging accuracy.

In order to accomplish the aforementioned and other objects, according to one aspect of the present invention, there is provided a stereo camera adjusting system for adjusting an optical axis of a stereo camera having first and second cameras arranged at regular intervals, the system comprising: image adjusting means for geometrically transforming an image, which is picked up by the second camera, by a translation correction and a rotation correction, and for geometrically transforming an image, which is picked up by the first camera, by a rotation correction; and correction operating means for calculating a difference between corresponding positions of the images, which are picked up by the first and second cameras, on the basis of distance data obtained by stereo-processing the pair of images picked up by the first and second cameras, and for setting a transforming value for the image transformation so as to remove the difference.

The correction operating means may calculate the difference on the basis of two distant regions substantially at the same distance and one near region. The correction operating means may define a range including regions corresponding to the regions, in the image picked up by the second camera, on the basis of distance data of the distant regions of the image picked up by the first camera, and search the defined range to derive the distant regions of the image picked up by the second camera. The image adjusting means may geometrically transform the image, which is picked up by the second camera, by a horizontal translation correction and a vertical translation correction, and the correction operating means may calculate a transforming value for the image transformation based on the horizontal translation correction for the image picked up by the second camera, on the basis of a deviation between the positions of the regions of the images picked up by the first and second cameras, and distances of the regions. The correction operating means may set the transforming value for the image transformation on the basis of a pair of images of a landscape picked up by the first and second cameras.

According to another aspect of the present invention, there is provided a stereo camera adjusting method for adjusting an optical axis of a stereo camera having first and second cameras provided at regular intervals, the method comprising the steps of: calculating a difference between corresponding positions of images picked up by the first and second cameras, on the basis of distance data obtained by stereo-processing the pair of images picked up by the first and second cameras; setting a translation correction value and a rotation correction value for the second camera so as to remove the calculated difference; and geometrically transforming the image picked up by the second camera, by a translation correction and a rotation correction, on the basis of the set translation correction value and the set rotation correction value for the second camera.

The stereo camera adjusting method may further comprise the steps of: setting a rotation correction value for the first camera so as to remove the calculated difference; and geometrically transforming the image picked up by the first camera, by a rotation correction on the basis of the set rotation correction value for the first camera.

That is, according to the present invention, on the basis of distance data obtained by processing a pair of images of a landscape picked up by a stereo camera, a difference between corresponding positions of images picked up by first and second cameras is calculated. Then, an image transforming value for a rotation correction in the image picked up by the first camera, and image transforming values for a translation correction and a rotation correction in horizontal and vertical directions in the image picked up by the second camera are set so as to remove the difference. Then, the images picked up by the first and second cameras are geometrically transformed to automatically correct the age-based deviation of the optical axis of the stereo camera.

Thus, since the age-based deviation of the optical axis of the stereo camera is automatically adjusted while maintaining the operating state thereof from an early stage, in which it is possible to disregard the influence on ranging accuracy, it is possible to always use the stereo camera in an accurately adjusted state, and it is not required to stop the operation of the stereo camera in a field unlike the technique for picking up an image of a special adjusting pattern to adjust the optical position of the stereo camera, so that there are excellent advantages in that it is possible to achieve maintenance free.

The difference between the corresponding positions is preferably calculated on the basis of two distant regions, which are arranged substantially at the same distance, and one near region. Thus, it is possible to simultaneously carry out corrections for relative positions of the respective images and a correction for causing the horizontal line of the first camera to be parallel to the base line of the stereo camera.

In addition, the positions of the distant regions of the image picked up by the second camera may be obtained by adding distance data to the positions of the distant regions of the image picked up by the first camera, defining a range including corresponding regions, in the image picked up by the second camera, and searching the defined range. The horizontal translation correction for the image picked up by the second camera may be calculated on the basis of the deviations of the positions of the respective regions in the images picked up by the first and second cameras, and the distances of the respective regions.

BRIEF DESCRIPTION OF THE DRAWINGS

A preferred embodiment of the present invention will become understood from the following detailed description referring to the accompanying drawings.

In the drawings.

DETAILED DESCRIPTION OF THE PREFERRED EMBODIMENT

Referring now to the accompanying drawings, the preferred embodiment of the present invention will be described below. FIGS. 1 through 9 show the preferred embodiment of the present invention.

Figure 3A:
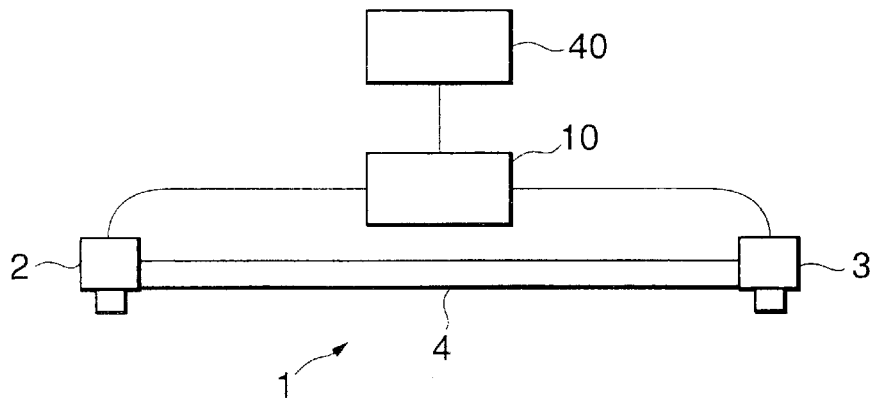
FIGS. 3A and 3B are schematic diagrams showing the whole constructions of a stereo camera adjusting system according to the present invention.
Figure 3B:
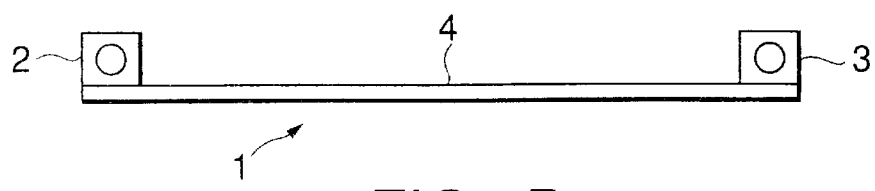

First, referring to FIGS. 3A and 3B, the whole construction of the preferred embodiment of the present invention will be described. Furthermore, FIGS. 3A and 3B are top and side views of a stereo camera, respectively. In FIGS. 3A and 3B, a stereo camera 1 comprises two cameras 2 and 3 synchronized with each other. Each of the cameras 2 and 3 is provided with an image sensor, such as a charge coupled device (CCD), therein and capable of changing the shutter speed thereof. One camera (first camera) 2 serves as a main camera for picking up a reference image for a stereo processing, and the other camera (second camera) 3 serves as a sub-camera for picking up a comparative image for the stereo processing. These cameras 2 and 3 are provided on a stay 4 at-regular intervals.

Two images picked up by the cameras 2 and 3 are inputted to a stereo processing unit 40 via an image input unit 10. In the stereo processing unit 40, the conformity of the two images with each other is estimated by the stereo matching to calculate a three-dimensional position of an object, to recognize an image of the object, and so forth. In this case, the two cameras 2 and 3 are adjusted to be fixed on the stay 4 so that the optical axes thereof are parallel to each other at an initial manufacturing stage. However, there are the possibilities that the deviations of the optical axes are gradually caused in usual use, and the ranging accuracy is gradually lowered in the long run, so that errors can not disregarded finally.

For that reason, the image input unit 10 provided between the cameras 2, 3 and the stereo processing unit 40 has the function of adjusting the optical positions of the cameras 2 and 3 by an image correction, to automatically correct the deviations of images picked up by the cameras 2 and 3 to precisely and equivalently adjust the optical axes of the cameras 2 and 3 in a stage that the deviations of the optical axes of the cameras 2 and 3 are minor, i.e., in an early stage that mismatching is small during the stereo matching in the stereo processing unit 40.

Figure 1:
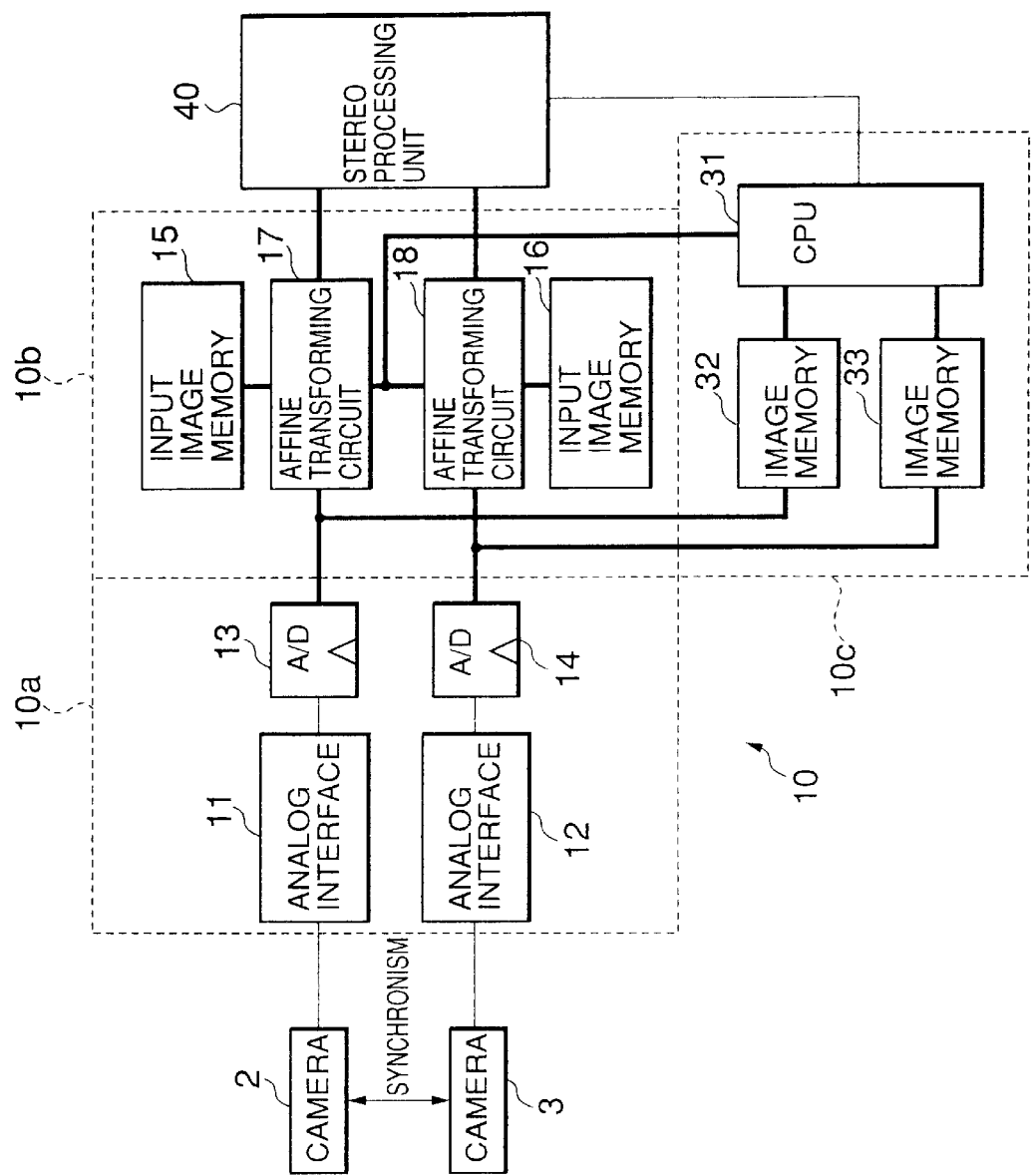
FIG. 1 is a block diagram of a preferred embodiment of a stereo camera adjusting system according to the present invention.

Referring now to FIG. 1, the detail of the image input unit 10 of FIG. 3 will be described below.

As shown in FIG. 1, the image input unit 10 comprises: an image input part 10a for inputting a picked-up image; an image adjusting part 10b for carrying out a geometrical transformation, such as rotation and parallel displacement of the image; and a correction operating part 10c for calculating an transforming value for the image.

The image input part 10a has analog interfaces 11 and 12 for adjusting analog images, which are outputted from the cameras 2 and 3, to downstream input ranges, and A/D converters 13 and 14 for transforming the analog images into digital images having predetermined brightness and gradation (e.g., a gray scale of 256 gradations).

The image adjusting part 10b has input image memories 15 and 16 for temporarily storing the digitized images, and affine transforming circuits 17 and 18 for carrying out a geometrical transformation, such as rotation and parallel displacement, of the digital images stored in the input image memories 15 and 16 to output the geometrically transformed images to the stereo processing unit 40.

Figure 2:
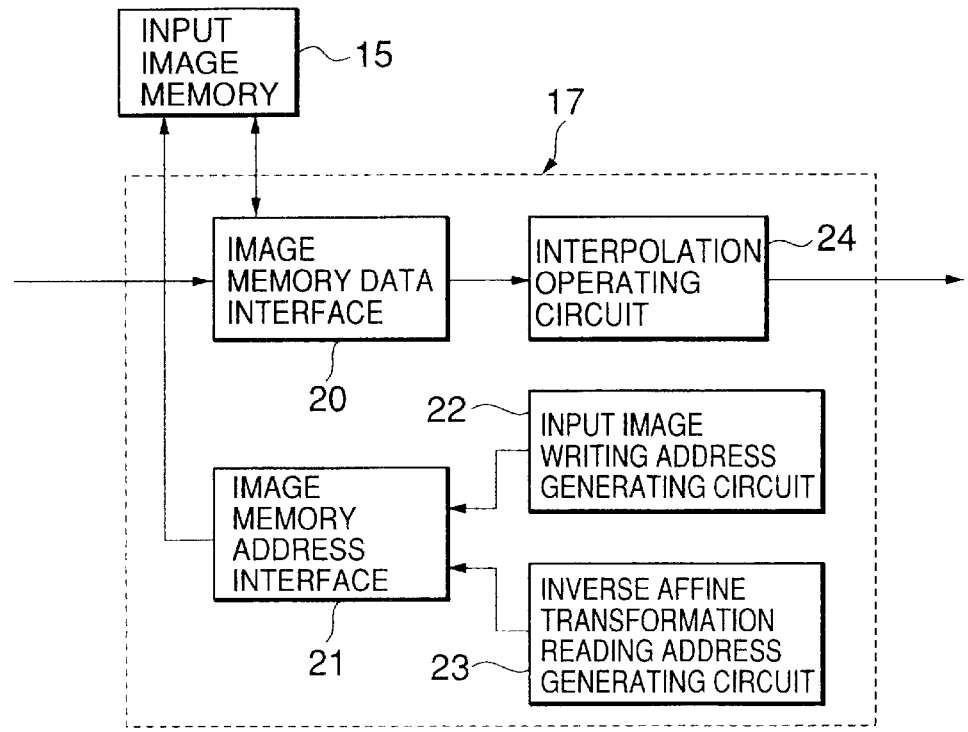
FIG. 2 is a block diagram showing the detail of an image adjusting part (an affine transforming circuit) of FIG. 1.

The affine transforming circuits 17 and 18 carry out corrections when the corresponding points of the images picked up by the cameras 2 and 3 move geometrically from the original positions due to the deviations of the optical axes. As a representative one of the affine transforming circuits 17 and 18, the internal construction of the affine transforming circuits 17 is shown in FIG. 2.

The affine transforming circuit 17 comprises: an image memory data interface 20 for writing data into the input image memory 15 and for reading data out of the input image memory 15; an image memory address interface 21 for addressing the input image memory 15; an input image writing address generating circuit 22 for generating an address when the image data outputted from the A/D converter 13 are written in the input image memory 15; an inverse affine transformation reading address generating circuit 23 for generating an address, which is used for reading the image data out of the input image memory 15 to geometrically transform the image, by the inverse affine transformation; and an interpolation operating circuit 24 for carrying out the linear interpolation of data, which have been read by the inverse affine transformation, to output transformed image data.

That is, in the geometrical transformation of the image using the affine transforming circuits 17 and 18, the original image before transformation and the transformed image are digital images wherein pixels are arranged in the form of a grid, and the concentration values of the pixels on the transformed image are given by the concentration values of the corresponding pixel positions derived by the inverse affine transformation of the original image. The corresponding pixel positions derived by the inverse affine transformation are not generally integer pixel positions, so that the pixels on the transformed image do not correspond to any pixels on the original image. Therefore, the interpolation operating circuit 24 carries out the linear interpolation using the concentration values of four surrounding pixels, to closely derive the concentration values of the pixels on the transformed image.

Figure 4:
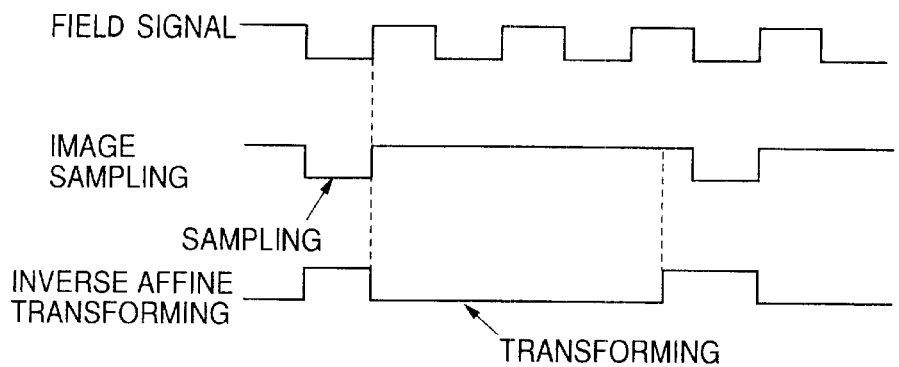
FIG. 4 is a timing chart showing the image capturing timing and affine transforming timing in the image adjusting part of FIG. 1.

As shown in FIG. 4, when image signals outputted from the cameras 2 and 3, e.g., image signals, such as NTSC picture signals, outputted from the cameras 2 and 3 in synchronism with a line synchronizing signal and a frame synchronizing signal, are sampled in a sampling period of a field signal, the affine transforming circuits 17 and 18 transform the sampled image in the next field interval.

That is, the gain offset and so forth of image signals outputted from the cameras 2 and 3 are adjusted to the input ranges of the A/D converters 13 and 14 by means of the analog interfaces 11 and 12. The digital image data converted by the A/D converters 13 and 14 are stored in the input image memories 15 and 16 in accordance with addresses generated by the input image writing address generating circuits 22 and 22 of the affine transforming circuits 17 and 18. In the next field interval, the concentration data at addresses generated by the inverse affine transformation reading address generating circuits 23 and 23 of the affine transforming circuits 17 and 18 are read out of the input image memories 15 and 16. Then, the interpolation operations of the concentration data are carried out by means of the interpolation operating circuits 24 and 24 of the affine transforming circuits 17 and 18 to output the transformed images to the stereo processing unit 40.

The correction values for the variations of optical axes of the cameras 2 and 3, i.e., the image transforming values in the affine transforming circuit 17 and 18, can be obtained from coordinate data of a coincident point measured from a picked-up image, which is obtained by picking up a special adjusting pattern arranged at a known distance (a distance by which a parallax can be inversely calculated). However, according to the present invention, while an image of an ordinary landscape is picked up to carry out the usual operation for the stereo image processing without the need of any special adjusting patterns, the correction values are operated by the correction operating part 10c to be fed to the affine transforming circuits 17 and 18 as the image transforming values to automatically make an adjustment.

The correction operating part 10c comprises a computer having a CPU 31, image memories 32 and 33 and so forth. The correction operating part 10c is connected to the A/D converters 13 and 14 of the image input unit 10 via the image memories 32 and 33, and to the stereo processing unit 40. It is noted that the correction operating part 10c may be a part of the stereo processing unit 40 and carry out the correction processing as a background job of the stereo image processing.

Referring to a flow chart of FIG. 5, the image correction carried out by the image adjusting part 10b and the correction operating part 10c will be described below.

Figure 5:
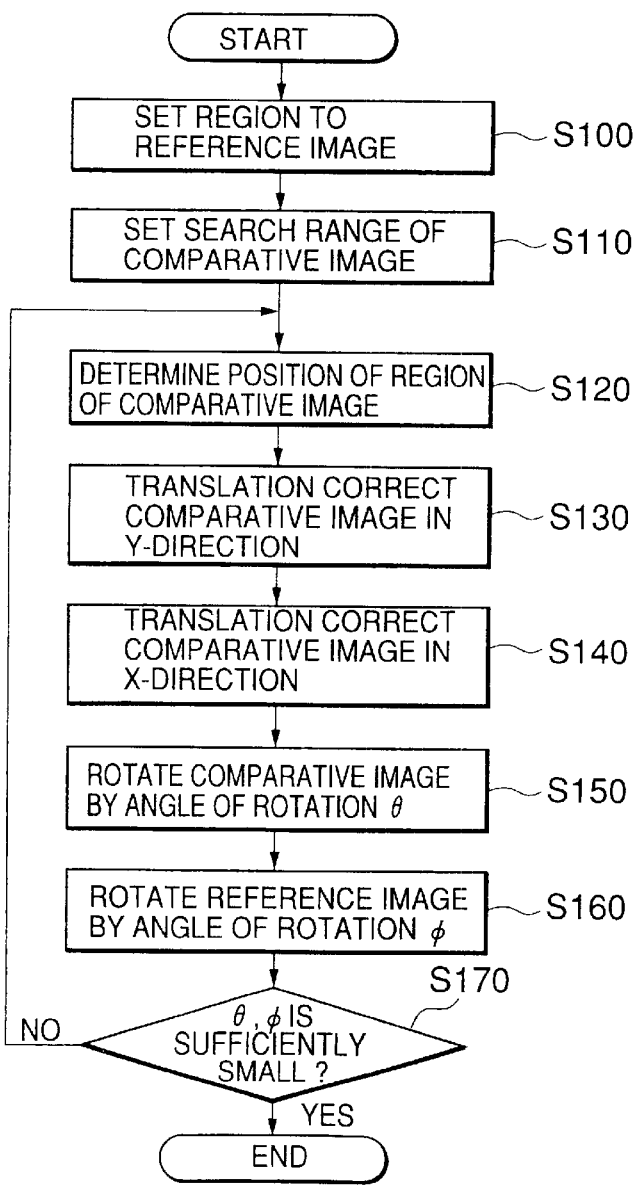
FIG. 5 is a flow chart of an image correcting routine in a correction operating part of FIG. 1.

FIG. 5 is an image correcting routine executed by the CPU 31 of the correction operating part 10c every a predetermined period. In this routine, at step S100, the results of a group filter, which are obtained when images of a landscape picked up by the cameras 2 and 3 are processed to extract three-dimensional object data from a distance image, are read out of the stereo processing unit 40, and some small regions for operating correction values are set in the image picked up by the main camera 2, i.e., in a reference image.

For example, it is assumed that each of the small regions is a region of 16×16 pixels, the half or more of which include corresponding distance image data. As the small regions, three regions including two distant regions at a long distance of about 50 to 60 m and one near region at a short distance of up to about 5 m are selected. The two distant regions are spaced from each other so as to have substantially the same distance data. Furthermore, the group filter is a software filter for detecting a group having an image deviation similar to those of surrounding pixels to efficiently remove noises included in the distance image. Such a group filter is disclosed in Japanese Patent Application No. 9-86877, which is assigned to the present Assignee and incorporated herein by reference.

Then, the routine goes to step S110 wherein distance data (deviation) are added to the positions of the respective regions of the reference image set at step S100, to define a range for searching the corresponding regions in the image picked up by the sub-camera 3, i.e., in the comparative image. Then, at step S120, this range is searched to derive the positions of the regions at a resolution of one pixel or less (e.g., a resolution of 1/10 pixels) by the sub-pixel processing.

Figure 6:
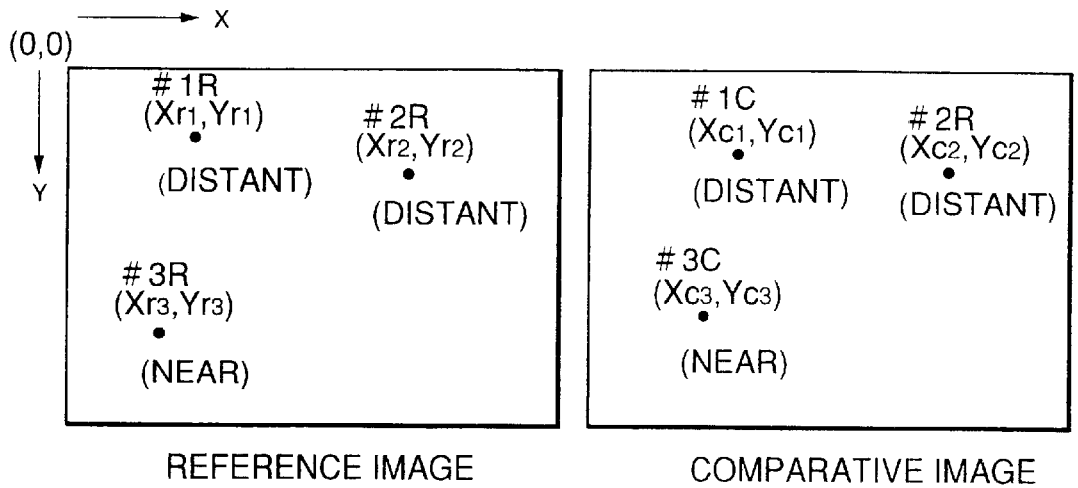
FIG. 6 is a schematic diagram for explaining corresponding regions between a reference image and a comparative image.

As a result, as shown in FIG. 6, in a coordinate system wherein the origin is arranged at a left-upper corner of an image and X and Y coordinates are arranged in horizontal and vertical directions, the position coordinates (Xc1, Yc1) and (Xc2, Yc2) of two distant regions #1C and #2C and the position coordinate (Xc3, Yc3) of one near region #3C of the comparative image are derived for the position coordinates (Xr1, Yr1) and (Xr2, Yr2) of two distant regions #1R and

2R and the position coordinate (Xr3, Yr3) of one near region #3R of the reference image.

Subsequently, at step S130, a difference between the Y components of the position coordinates of one of the two distant regions on the reference image side and the corresponding distant region on the comparative image side, e.g., a difference (Yr1−Yc1) between the Y components of the position coordinate (Xr1, Yr1) of the left distant region #1R on the reference image side and the position coordinate (Xc1, Yc1) of the corresponding left distant region #1C on the comparative image side in FIG. 6, is derived to be added to the set value of the affine transforming circuit 18 on the comparative image side as a Y direction translation correction value, i.e., as an image translating transformation value in Y directions, to parallel-displace the image (the comparative image) of the sub-camera 3 in Y directions.

Then, the routine goes to step S140 wherein an X direction translation correction value for the comparative image is derived to be added to the set value of the affine transforming circuit 18 on the comparative image side to parallel-displace the image of the sub-camera 3 in X directions. This X direction translation correction value can be given by a deviation Z0 between the reference and comparative images at infilty. The deviation Z0 at infinity can be represented by the following formula (1) using a distance d1 to the distant region, a distance d3 to the near region, a deviation Z1 between the reference and comparative images in the distant region, and a deviation Z3 between the reference and comparative images in the near region. Thus, it is assumed that −Z0 is a translation amount of the comparative image in lateral directions (X directions).

$$Z0=(d3 \cdot Z3-d1 \cdot Z1)/(d1-d3) \tag{1}$$

Originally, at the corresponding points of the reference and comparative images, only X coordinates in horizontal directions must be different to detect a parallax, and Y coordinates must be the same. Therefore, at the above step S130, the positions of the Y coordinates of one of the two distant regions in the reference and comparative images are caused to be coincident wit each other, and at the above step S140, the position of the X coordinate in the reference image is adjusted to a position, at which the original parallax is to be detected.

Figure 7:
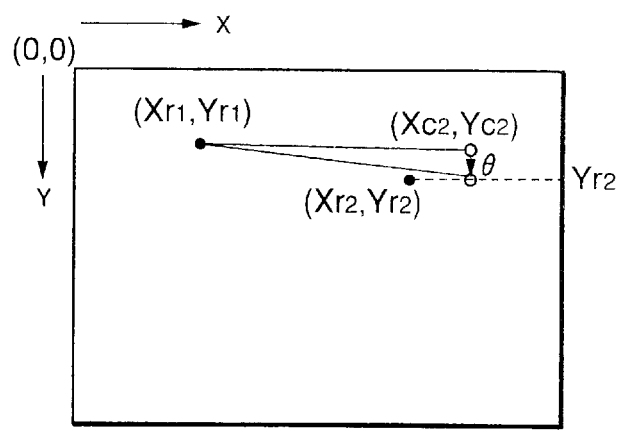
FIG. 7 is a schematic diagram for explaining an angle of rotation in the affine transformation of a comparative image.

Then, at step S150, the comparative image is rotated so that the position of the Y coordinate of the other region of the comparative image is coincident with that of the reference image. That is, as shown in FIG. 7, the comparative image is rotated about the position coordinate (Xr1, Yr1) of the left distant region #1R of the reference image so that the Y coordinate value Yc2 of the right distant region #2C of the comparative image is coincident with the Y coordinate value Yr2 of the right distant region #2R of the reference image. When the coordinate (Xc2, Yc2) is rotated about the coordinate (Xr1, Yr1) by an angle of rotation θ, a coordinate (Xc2′, Yc2′) after rotation can be represented by the following formula (2).

$$\begin{pmatrix} Xc2' \\ Yc2' \end{pmatrix} = \begin{pmatrix} \cos\vartheta & -\sin\vartheta \\ \sin\vartheta & \cos\vartheta \end{pmatrix} \begin{pmatrix} Xc2-Xr1 \\ Yc2-Yr2 \end{pmatrix} + \begin{pmatrix} Xr1 \\ Yr1 \end{pmatrix} \tag{2}$$

If the Y coordinate value Yc2′ of the region #2C of the comparative image after rotation is coincident with the Y coordinate value Yr2 of the region #2R of the reference image, and the above formula (2) is rearranged with respect to only Y components assuming that Yc2′=Yr2, the following formula (3) can be obtained.

$$Yr2-Yr1=(Xc2-Xr1)\cdot\sin\theta+(Yc2-Yr1)\cdot\cos\theta \tag{3}$$

Moreover, if Yr2−Yr1=A, Xc2−Xr1=B, Yc2−Yr1=C, and $\cos\theta=\pm(1-\sin^2\theta)^{1/2}$ are substituted for the above formula (3) to solve the formula (3) with respect to sin θ, the following formula (4) can be obtained.

$$\sin\theta=(A \cdot B \pm C \cdot (B^2+C^2-A^2)^{1/2})/(B^2+C^2) \tag{4}$$

When Yr2=Yc2 and A=C, i.e., when the Y coordinate value of the right distant region #2R of the reference image has been coincident with the Y coordinate value of the right distant region #2C of the comparative image, the above formula (4) is 0 since rotation is not required. In this case, it can be seen from the following formula (5) that the sign of the second term of the numerator of the above formula (4) must be negative.

$$\sin\theta=B \cdot (A \pm C)/(B^2+C^2)=0 \tag{5}$$

Therefore, the angle of rotation θ can be derived by the following formula (6). Tis angle of rotation θ is added to the set value of the affine transforming circuit 18 on the comparative image side as an image rotating transformation value about the coordinate (Xr1, Yr1) to rotate the image (the comparative image) of the sub-camera 3.

$$\theta=\sin^{-1}(A \cdot B-C \cdot (B^2+C^2A^2)^{+e,fra\ 1/2}+ee\ )/(B^2+C^2) \tag{6}$$

Figure 8:
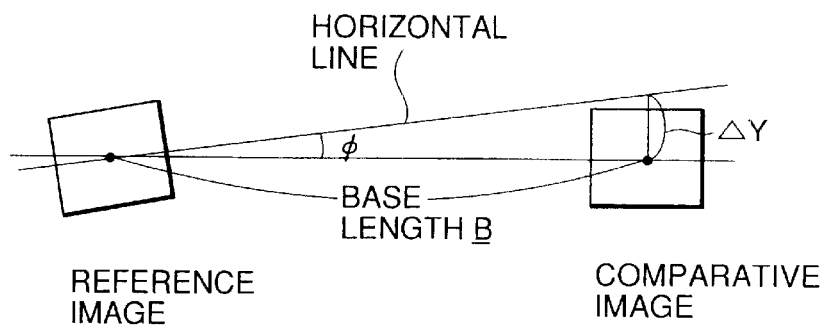
FIG. 8 is a schematic diagram for explaining the deviation of a horizontal line of a main camera from a base line.
Figure 9:
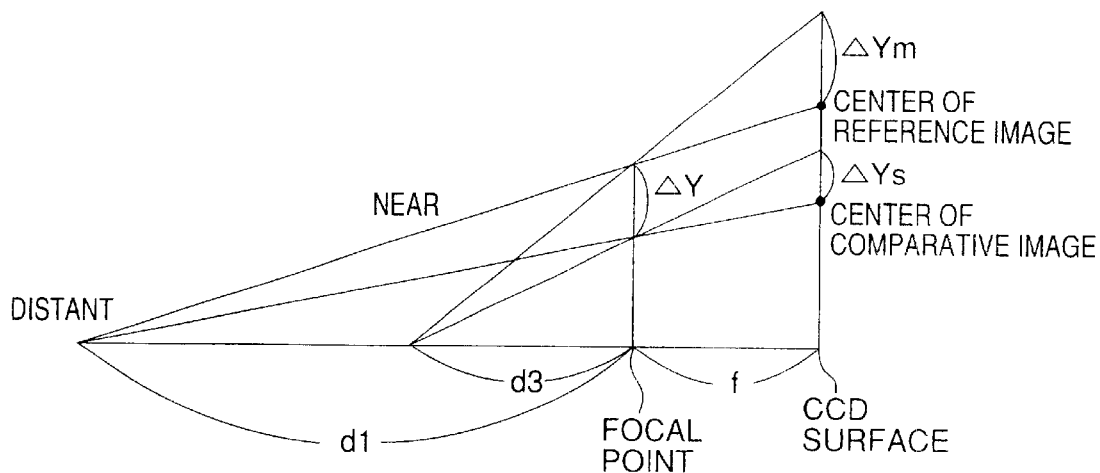
FIG. 9 is a schematic diagram for explaining a camera system viewed from side.

By this rotation of the comparative image, the near region #3C of the comparative image is also rotated. When the base lines of the cameras 2 and 3 are not parallel to the horizontal line of the main camera 2 so that the horizontal line of the main camera 2 is inclined by an angle φ with respect to the base lines as shown in FIG. 8, there is a difference ΔYm−ΔYs between the Y coordinate value Yr3 of the near region #3R of the reference image and the Y coordinate value Yc3 of the near region #3C of the comparative image after rotation as shown in FIG. 9.

Therefore, at the next step S160, the rotation by the angle of rotation φ about the coordinate (Xr1, Yr1) on the reference image side is added to the set value in order to remove the difference ΔYm−ΔYs. As can be seen clearly from FIG. 8, the angle of rotation φ can be derived from the base length B of the cameras 2 and 3 and a deviation ΔY between the centers of the reference and comparative images on a focal plane. The deviation ΔY can be derived using the focal point f, the distance d1 to the distant region, the distance d3 to the near region and the difference ΔYm−ΔYs on the basis of the geometrical relationship when the camera system is viewed from side as shown in FIG. 9.

That is, the deviation ΔY can be derived by the following formula (7) using the difference Δm−ΔYs between the deviation ΔYm of the near region from the center of the reference image formed on the CCD surface (image picked-up surface) and the deviation ΔYs of the near region from the center of the comparative image formed on the CCD surface. From the deviation ΔY and the base length B, the angle of rotation φ can be finally derived by the following formula (8)

$$\Delta Y=(\Delta Ym-\Delta Ys)\cdot d1 \cdot d3/(f \cdot (d1-d3)) \tag{7}$$

$$\phi = \tan^{-1}(\Delta Y/B) \tag{8}$$
$$= \tan^{-1}((\Delta Ym-\Delta Ys) \cdot d1 \cdot d3)/(B \cdot f \cdot (d1-d3))$$

When the comparative and reference images are rotated in the above manner, the routine goes from the above step S160 to step S170 wherein it is examined whether the angles of rotation θ and φ are sufficiently small to be within a range of allowable values. When the angles of rotation θ and φ have not reached the allowable values, the routine returns to the step S120 wherein the position of the corresponding region of the comparative image is determined by the sub-pixel processing again. Then, the same processing is repeated, and when the angles of rotation θ and φ are sufficiently small below the allowable value, the routine ends.

Thus, the deviations of the optical axes of the cameras 2 and 3 gradually caused in usual use can be automatically corrected while maintaining the operation state in the field.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A stereo camera adjusting system for adjusting an optical axis of a stereo camera having first and second cameras arranged at regular intervals, comprising:

image adjusting means for geometrically transforming one of a first image picked up by said first camera and a second image picked up by said second camera by a translation correction value and a rotation correction value; and correction operating means for calculating said translation correction value and said rotation correction value based on coordinate differences of a plurality of corresponding positions between said first image and said second image, wherein said corresponding positions include at least a position at long range from said stereo camera and a position at short range near said stereo camera.

2. The stereo camera adjusting system as set forth in claim 1, wherein said correction operating means calculates a vertical direction translation correction value based on a deviation of coordinates between said first image and said second image at said corresponding positions at long range and then calculates a horizontal direction translation correction value given by a deviation at infinity between said first image and said second image based on distances to said corresponding positions at long range and short range.

3. The stereo camera adjusting system as set forth in claim 2, wherein said correction operating means further calculates said rotation correction value based on coordinate differences of two corresponding positions at long range and one corresponding position at short range between said first image and said second image.

4. The stereo camera adjusting system as set forth in claim 1, wherein said image adjusting means is an affine transforming circuit.

5. A stereo camera adjusting method for adjusting an optical axis of a stereo camera having first and second cameras arranged at regular intervals and a transforming circuit having image transforming values for transforming first and second images picked up by said first and second cameras, respectively, comprising:

calculating a translation correction value and a rotation correction value based on coordinate differences of a plurality of corresponding positions between said first and second images, said corresponding positions include at least a position at long range from said stereo camera and a position at short range near said stereo camera; and correcting said image transforming values by said translation correction value and said rotation correction value.

6. The stereo camera adjusting method as set forth in claim 5, wherein said calculating further comprises:

calculating a vertical direction translation correction value based on a deviation of coordinates between said first and second images at said corresponding positions at long range;

calculating a horizontal direction translation correction value given by a deviation at infinity between said first and second images based on distances to said corresponding positions at long range and short range; and calculating said rotation correction value based on coordinate differences of two corresponding positions at long range and one corresponding position at short range between said first and second images.

* * * * *